(12) United States Patent
Noh et al.

(10) Patent No.: US 7,452,109 B2
(45) Date of Patent: Nov. 18, 2008

(54) EDGE LIGHT TYPE BACKLIGHT UNIT HAVING HEAT SINK SYSTEM

(75) Inventors: Ji-whan Noh, Suwon-si (KR); Jong-min Wang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/373,440

(22) Filed: Mar. 13, 2006

(65) Prior Publication Data
US 2006/0203510 A1 Sep. 14, 2006

(30) Foreign Application Priority Data
Mar. 12, 2005 (KR) .................. 10-2005-0020796

(51) Int. Cl.
F21V 7/04 (2006.01)
F21V 29/00 (2006.01)

(52) U.S. Cl. .................. 362/294; 362/373; 362/613; 362/632

(58) Field of Classification Search .................. 362/612, 362/345, 294, 373, 600–634, 580, 547, 126, 362/218, 264
See application file for complete search history.

(56) References Cited

U.S. PATENT DOCUMENTS

| 7,164,224 | B2* | 1/2007 | Hayashi et al. .............. 313/27 |
| 7,210,842 | B2* | 5/2007 | Chen et al. .................. 362/632 |
| 2002/0113534 | A1 | 8/2002 | Hayashi et al. |
| 2002/0113919 | A1 | 8/2002 | Liu et al. |
| 2004/0008487 | A1 | 1/2004 | Hisano et al. |
| 2006/0098457 | A1* | 5/2006 | Chen et al. .................. 362/632 |

FOREIGN PATENT DOCUMENTS

| JP | 55-95937 | A | 7/1980 |
| JP | 8-136918 | A | 5/1996 |
| JP | 11-202800 | A1 | 7/1999 |
| JP | 2002-91330 | A | 3/2002 |
| JP | 2006-227072 | * | 2/2005 |
| KR | 2002-0047018 | A | 6/2002 |
| KR | 2003-0079599 | A | 10/2003 |

* cited by examiner

Primary Examiner—Bao Q Truong
(74) Attorney, Agent, or Firm—Sughrue Mion, PLLC

(57) ABSTRACT

An edge light type backlight unit having a heat sink system which can efficiently emit heat generated by a light emitting element. The edge light type backlight unit includes a light guide panel which guides light; light emitting elements which are arranged on the insides of opposite first and second surfaces of the light guide panel; and heat sinks which are provided on the outsides of the first and second surfaces and emit heat generated by the light emitting elements.

13 Claims, 8 Drawing Sheets

EDGE LIGHT TYPE BACKLIGHT UNIT HAVING HEAT SINK SYSTEM

CROSS-REFERENCE TO RELATED PATENT APPLICATION

This application claims the benefit of Korean Patent Application No. 10-2005-0020796, filed on Mar. 12, 2005, in the Korean Intellectual Property Office, the disclosure of which is incorporated herein in its entirety by reference.

BACKGROUND OF THE INVENTION

1. Field of the Invention

The present invention relates to an edge light type backlight unit having a heat sink system which can efficiently emit heat generated by a light emitting element.

2. Description of the Related Art

Generally, a liquid crystal display (LCD) device used in a notebook type computer, a desktop computer, or a mobile communication terminal is a kind of light receiving element and has a backlight unit in addition to a liquid crystal panel. A liquid crystal display (LCD) device, which is a flat panel display device, does not emit the light to form an image by itself. Since an LCD device is a light receiving element which receives light from an outside source to form an image, it requires a backlight unit in addition to a liquid crystal panel. The backlight unit is provided on the rear surface of the LCD device and irradiates the light.

Backlight units can be mainly classified into direct light type backlight units for radiating light from a plurality of light sources provided under the liquid crystal panel, and edge light type backlight units for radiating light from a light source provided on the sidewall of a light guide panel (LGP) to the liquid crystal panel. A cold cathode fluorescent lamp (CCFL) is generally used as an edge light type backlight unit. However, since a CCFL has a low color gamut, it is not suitable for a high-definition and high-resolution TVs or monitors. Recently, light emitting diodes (LEDs) have been used as light sources instead of the CCFLs. For example, a direct light type backlight unit can use an LED emitting Lambertian light as a point light source.

Figure 1A:
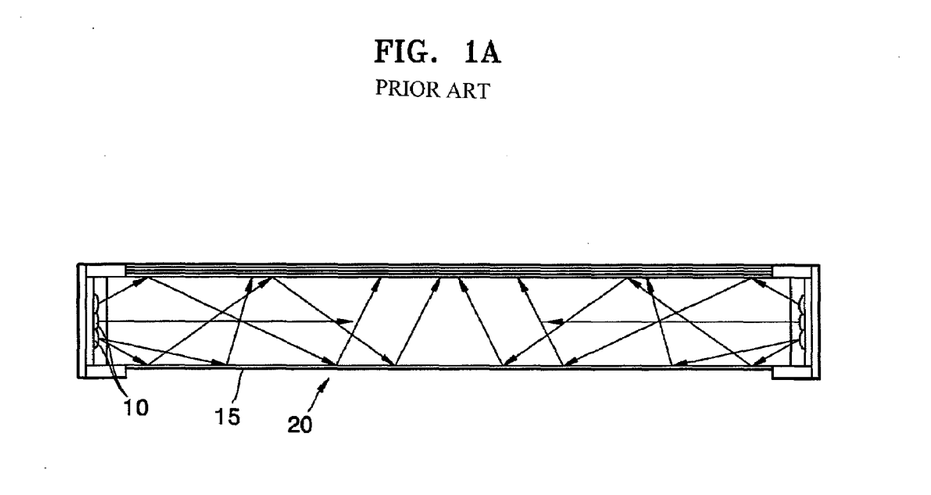
FIG. 1A is a schematic diagram of a conventional edge light type backlight unit.
Figure 1B:
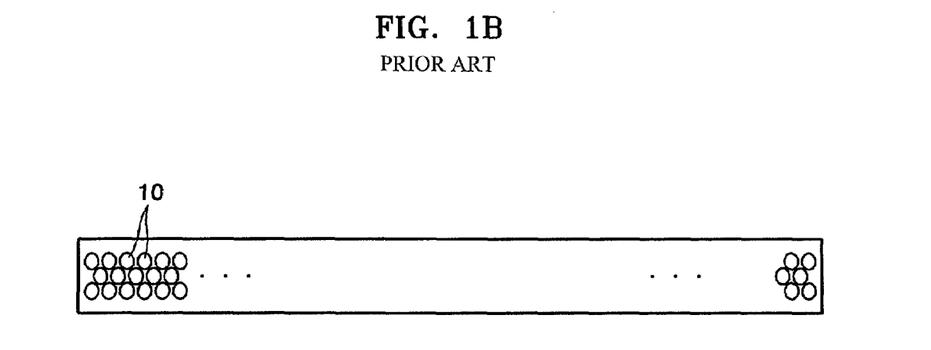
FIG. 1B is a plan view illustrating the arrangement of light emitting elements on the backlight unit shown in FIG. 1A.

Referring to FIG. 1A, a conventional backlight unit 20 includes LEDs 10 and a light guide panel 15 for guiding the light emitted from the LEDs 10 such that the light is incident on the liquid crystal panel. Referring to FIG. 1B, the LEDs 10 are arranged in a matrix. The LEDs include LEDs for emitting red light, green light and blue light, and the red light, the green light and the blue light are mixed in the light guide panel 15 to produce white light.

LEDs require low power and produce high quality light, but the heat generated by the LEDs adversely affects the brightness and the color temperature of the LEDs.

SUMMARY OF THE INVENTION

The present invention provides an edge light type backlight unit having a heat sink system which can efficiently emit heat generated by a light emitting element.

According to an aspect of the present invention, there is provided an edge light type backlight unit including: a light guide panel which guides light; light emitting elements which are arranged on the insides of opposite first and second surfaces of the light guide panel; and first and second heat sinks which are provided on the outsides of the first and second surfaces and emit heat generated by the light emitting elements.

The heat sink may include a plurality of heat sink pins in a length or width direction arranged on the first surface, and a plurality of heat sink pins in a length or width direction arranged on the second surface.

The heat sink may include: a first conductor having a first cover surface for covering the first surface and a second cover surface which is bent with respect to the first cover surface and extends along the surface of the light guide panel; and a plurality of heat sink pins arranged on the second cover surface, and the second heat sink may include: a second conductor having a third cover surface for covering the second surface and a fourth cover surface which is bent with respect to the third cover surface and extends along the surface of the light guide panel; and a plurality of heat sink pins arranged on the fourth cover surface.

The first heat sink may further include a plurality of heat pipes embedded in the first conductors and the second heat sink further comprises a plurality of heat pipes embedded in the second conductor.

The heat pipes may be L-shaped and the heat pipes may be arranged at regular intervals in the first and second conductors.

The first heat sink may further include a straight heat pipe extended in the length direction in the first conductor, and L-shaped heat pipes arranged in the second conductor at regular intervals.

The first surface may be the upper surface of the light guide panel and the second surface may be the lower surface of the light guide panel.

The first heat sink may include: a heat pipe having a first cover surface for covering the first surface and a second cover surface which is bent with respect to the first cover surface and extends along the surface of the light guide panel; and a plurality of heat sink pins arranged on the second cover surface, and the second heat sink may include: a second conductor having a third cover surface for covering the second surface and a fourth cover surface which is bent with respect to the second surface and extends along the surface of the light guide panel; and a plurality of heat sink pins arranged on the fourth cover surface.

According to another aspect, a backlight unit includes a light guide panel, light emitting elements attached to the light guide panel and a heat sink attached to the light emitting elements.

The heat sink may include a plurality of heat sink pins.

The light emitting elements may be arranged on edges of the backlight unit.

The light emitting elements may face a center of the light guide panel.

The light emitting elements may include a first set of light emitting elements disposed on a first surface of the light guide panel and a second set of light emitting elements disposed on a second surface of the light guide panel, the second surface being opposite the first surface.

The heat sink may include a first conductor attached to the light emitting elements, wherein the first conductor includes a first cover surface which covers a first surface on which the light emitting elements are disposed and a second cover surface, which is bent with respect to the first cover surface heat sink pins disposed on the second cover surface.

The heat sink may include a first conductor including a first conductor surface which covers the first surface and a second conductor including a second conductor surface which covers the second surface wherein the first conductor includes a third conductor surface which is bent at an angle with respect to the first conductor surface and the second conductor further includes a fourth conductor surface which is bent at an angle with respect to the second conductor surface and heat sink pins are disposed on the third and fourth conductor surfaces.

The heat sink may further include an L-shaped heat pipe arranged in the first conductor.

The heat sink may further include a straight heat pipe arranged in the first conductor.

The heat sink may further include heat pipes arranged in the first and second conductors, wherein the heat pipes are L-shaped.

The heat sink may further include heat pipes arranged in the first and second conductors, wherein the heat pipe arranged in the first conductor is L-shaped and the heat pipe arranged in the second conductor is straight.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY NON-LIMITING EMBODIMENTS OF THE INVENTION

Exemplary embodiments of the invention will now be described below by reference to the attached Figures. The described exemplary embodiments are intended to assist the understanding of the invention, and are not intended to limit the scope of the invention in any way.

Figure 2:
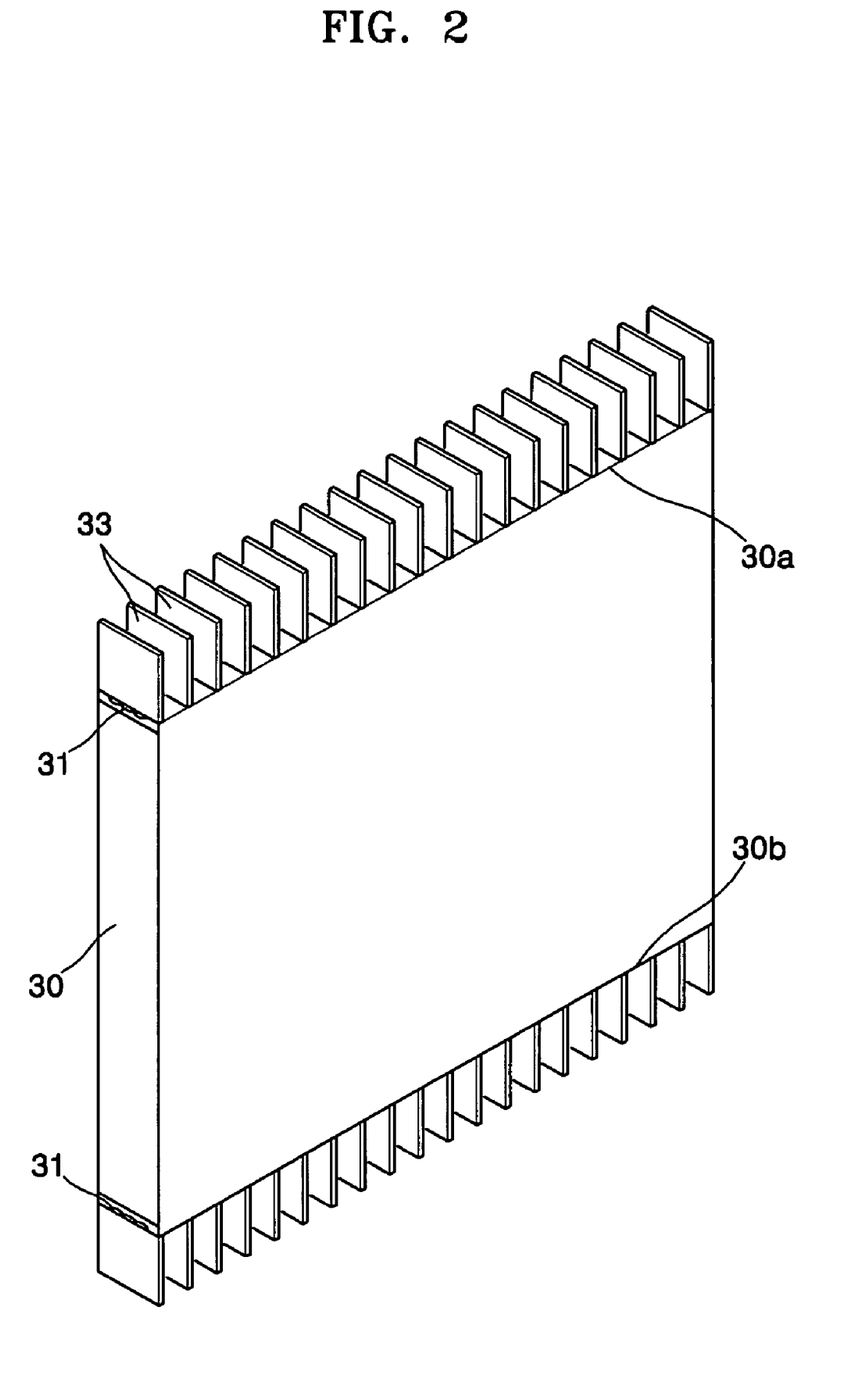
FIG. 2 is a perspective view of an edge light type backlight unit having a heat sink system according to a first exemplary embodiment of the present invention.

FIG. 2 is a perspective view of a backlight unit according to a first exemplary embodiment of the present invention. Referring to FIG. 2, a backlight unit according to a first exemplary embodiment of the present invention includes light emitting elements 31 which are arranged on the insides of opposite first and second surfaces 30a and 30b of a light guide panel 30 for guiding incident light in a predetermined direction.

The light guide panel 30 can be manufactured in various shapes, for example, a rectangular parallelepiped shape. The light emitting elements 31 are arranged on the side surfaces or on the upper and lower surfaces of the light guide panel 30 and the light emitted from the light emitting elements 31 is completely reflected in the light guide panel 30 to be directed onto a screen (not shown). The backlight unit according to the present exemplary embodiment is an edge light type backlight unit in which the light emitting elements are arranged on the edges of the backlight unit, and has a heat sink for emitting heat generated by the light emitting elements on the surface of the light guide panel on which the light emitting elements are arranged.

Figure 3:
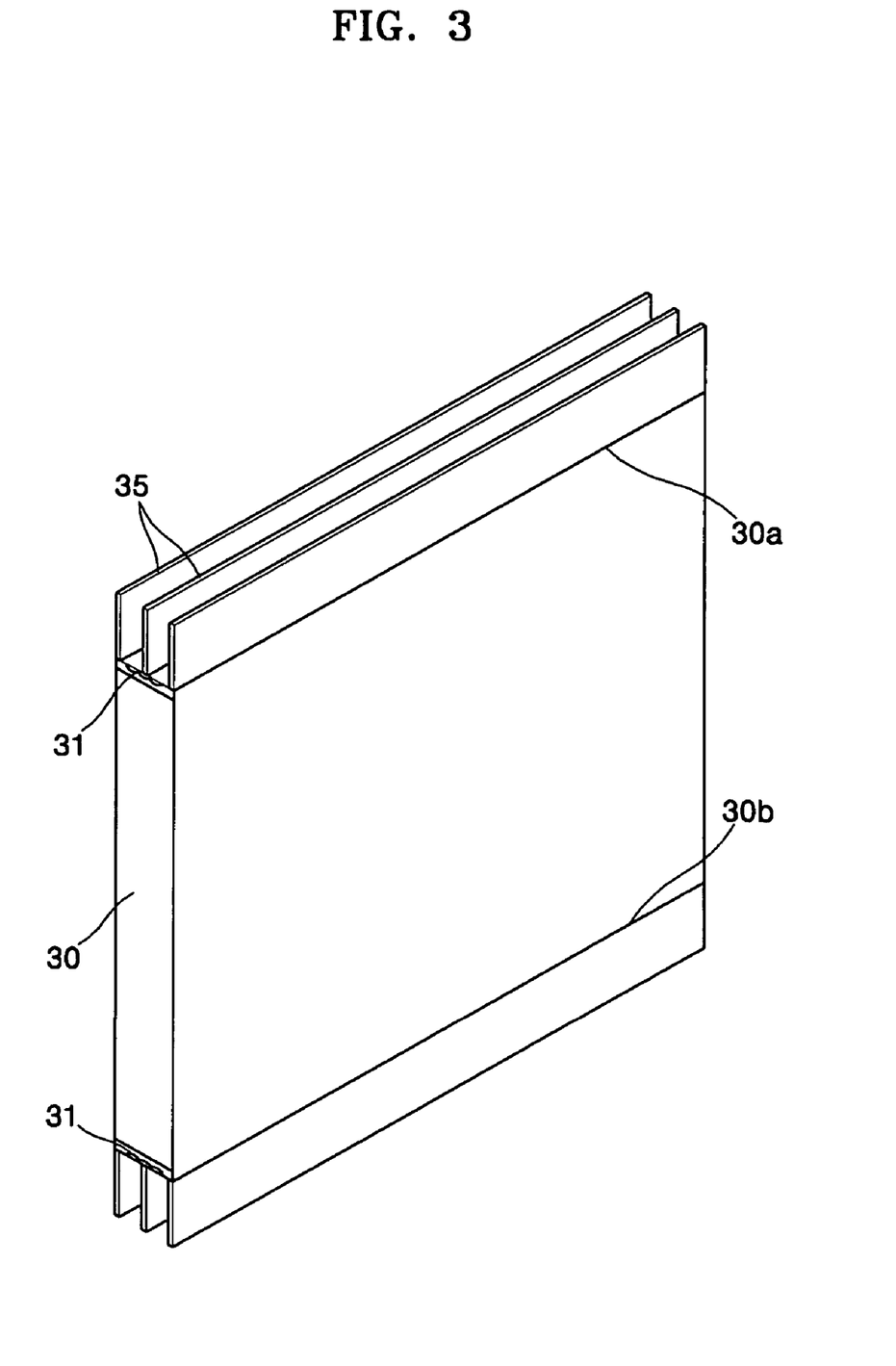
FIG. 3 is a perspective view illustrating a modification of the edge light type backlight unit having the heat sink system shown in FIG. 2.

The heat sink is composed of a plurality of heat sink pins 33. The light emitting elements 31 are arranged on the insides of the opposite first and second surfaces 30a and 30b of the light guide panel 30 and the plurality of the heat sink pins 33 are arranged on the outsides of the first and second surface 30a and 30b thereof at regular intervals. In FIG. 2, the heat sink pins 33 extend in the width direction of the first surface 30a and the second surface 30b. Alternatively, the heat sink pins 35 can extend in the length direction of the first surface 30a and the second surface 30b, as shown in FIG. 3.

The heat generated by the light emitting elements 31 is emitted through the heat sink pins 33, and the heat emitting efficiency can be increased by increasing the contact area between the heat sink pins 33 and the outside.

Figure 4A:
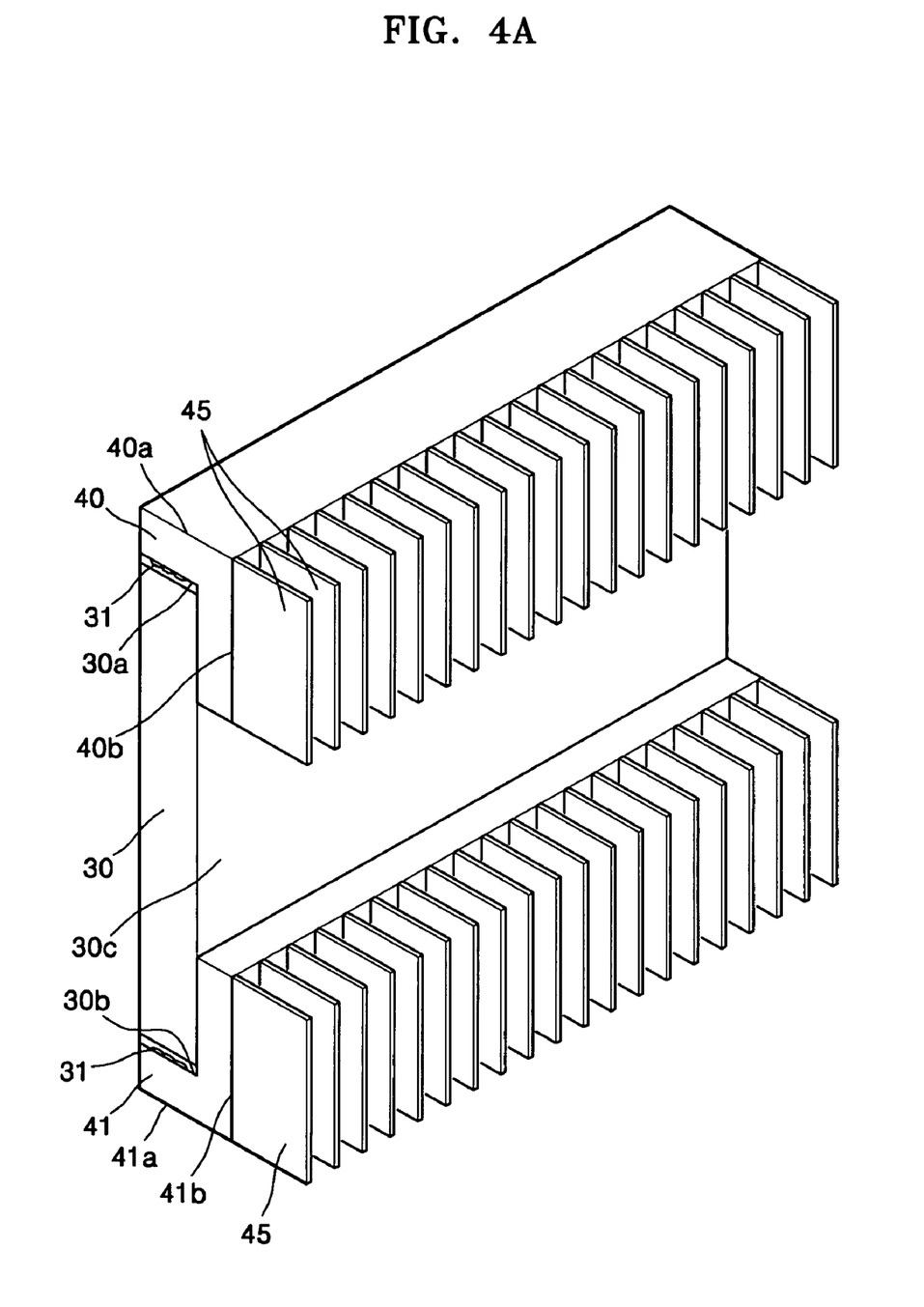
FIG. 4A is a perspective view of an edge light type backlight unit having a heat sink system according to a second exemplary embodiment of the present invention.

FIG. 4A is a perspective view of a backlight unit according to a second exemplary embodiment of the present invention.

Referring to FIG. 4A, the backlight unit includes a plurality of the light emitting elements 31 arranged at the insides of the opposite first and second surfaces 30a and 30b of the light guide panel 30 and L-shaped first and second conductors 40 and 41 are disposed on the first surface 30a and the second surface 30b, respectively. The shapes of the conductors may be changed according to the arrangement of the backlight, but the first and second L-shaped conductors 40 and 41 are used in the present exemplary embodiment. The first conductor 40 has a first cover surface 40a for covering the first surface 30a and a second cover surface 40b which is bent with respect to the first cover surface 40a to extend along the surface of the light guide panel 30 and covers a portion of a third surface 30c adjacent to the first surface 30a. The second conductor 41 has a third cover surface 41a for covering the second surface 30b and a fourth cover surface 41b which is bent with respect to the third cover surface 41a to extend along the surface of the light guide panel 30 and covers a portion of the third surface 30c adjacent to the second surface 30b.

The first cover surface 40a and the third cover surface 41a are provided on the surface of the light guide panel 30 on which the light emitting elements 31 are formed to deliver the heat generated by the light emitting elements 31 to the second cover surface 40b and the fourth cover surface 41b. Also, heat sink pins 45 are arranged on the second cover surface 40b and the fourth cover surface 41b. The heat sink pins 45 may extend in the width direction or the length direction of the light guide panel 30.

The first and second conductors 40 and 41 can be replaced with heat pipes. The heat pipes circulate the heat generated by the light emitting elements to cool the heating body.

Figure 4B:
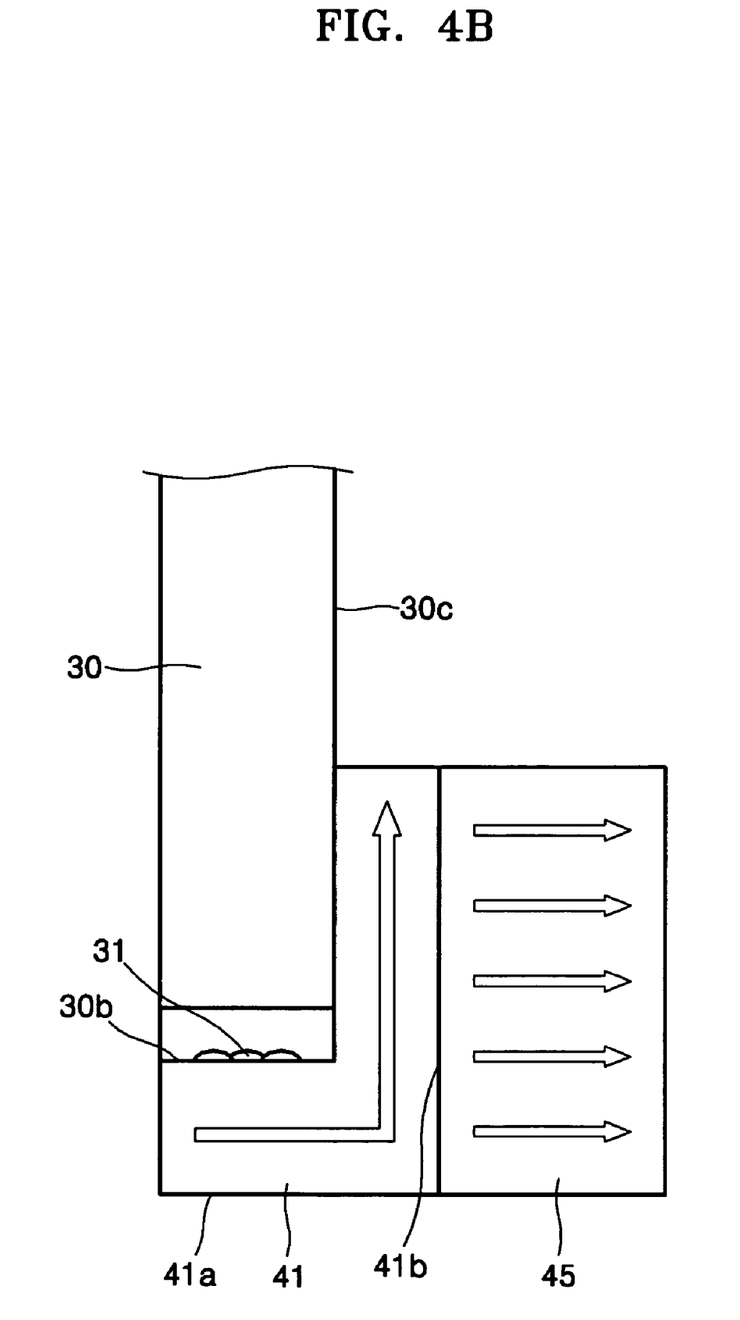
FIG. 4B is a schematic diagram illustrating the heat flow in the heat sink system shown in FIG. 4A.

FIG. 4B is a schematic diagram illustrating the flow of the heat generated by the light emitting elements 31 through the heat sink system shown in FIG. 4A. Referring to FIG. 4A, the heat generated by the light emitting elements 31 arranged on the second surface 30b of the light guide panel 30 is delivered to the heat sink pins 45 through the second conductor 41 and then is emitted to the outside through the heat sink pins 45.

In the first exemplary embodiment, the heat sink pins are arranged on the upper and lower sides or the side of the light guide panel, and, in the second exemplary embodiment, the heat sink pins are arranged on the third surface 30c of the light guide panel 30. The location of the heat sink pins can be selected as described according to the first and second exemplary embodiments. When the heat sink pins are arranged on the third surface 30c the size of the screen can be increased.

Figure 5:
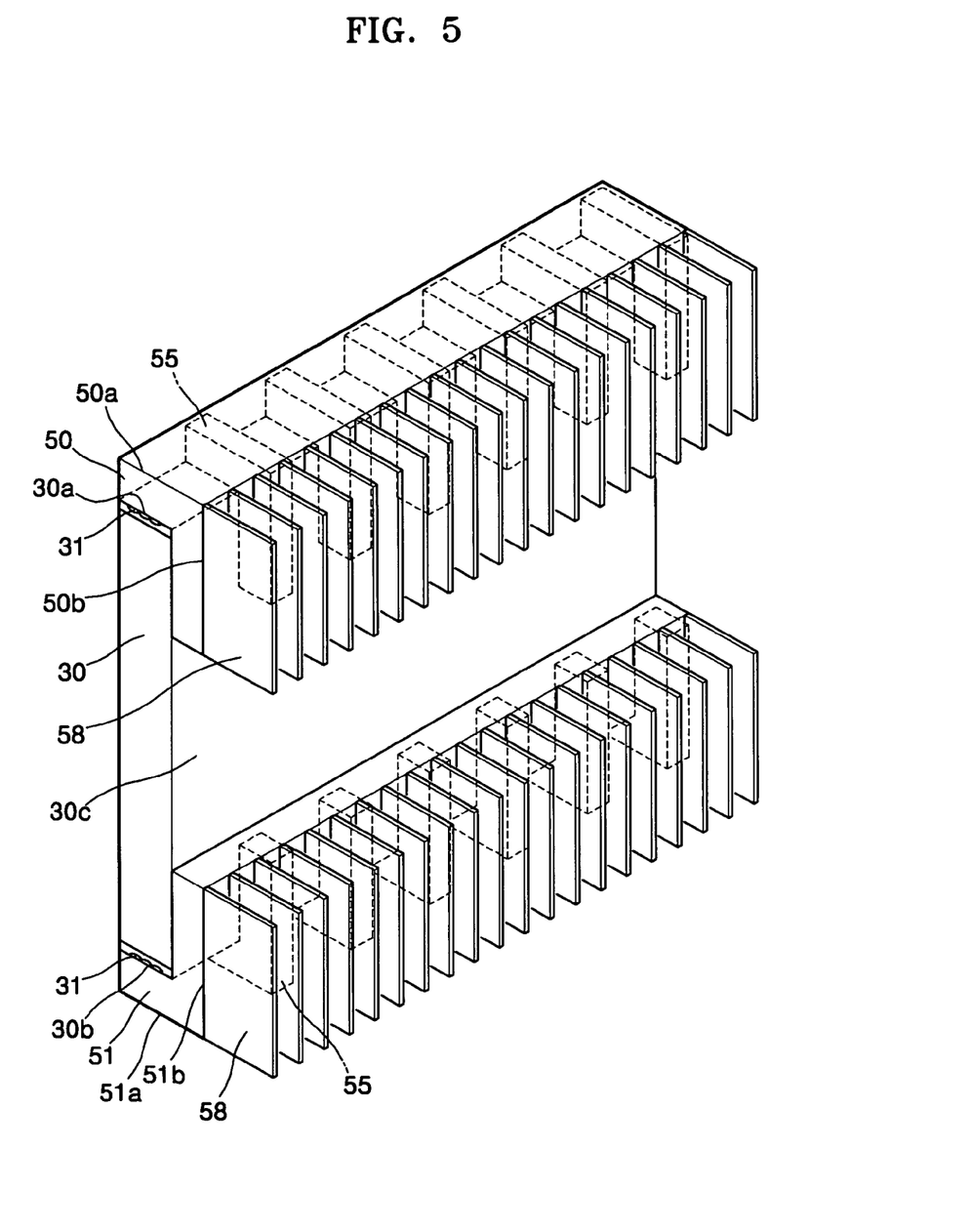
FIG. 5 is a perspective view of an edge light type backlight unit having a heat sink system according to a third exemplary embodiment of the present invention.

FIG. 5 is a perspective view of a backlight unit having a heat sink system according to a third exemplary embodiment of the present invention. The backlight unit includes light emitting elements 31 on the insides of the opposite first and second surfaces 30a and 30b. First and second L-shaped conductors 50 and 51 are disposed on the first surface 30a and the second surface 30b, respectively. Since the first conductor 50 and the second conductor 51 have the same structure and operation as the first conductor 40 and the second conductor 41 shown in FIG. 4A, their description will be omitted. Heat pipes are embedded in the first and second conductors 50 and 51. For example, a plurality of the L-shaped heat pipes 55 may be embedded in the first and second conductors 50 and 51 at regular intervals. The heat pipes 55 rapidly circulate the heat generated by the light emitting element 31 to exhaust the heat.

The first conductor 50 has a first cover surface 50a and a second cover surface 50b. The second conductor 51 has a third cover surface 51a and a fourth cover surface 51b. Heat sink pins 58 are arranged on the second cover surface 50b and the fourth cover surface 51b. The heat circulated by the heat pipes 55 is efficiently removed by the heat sink pins 58.

Figure 6:
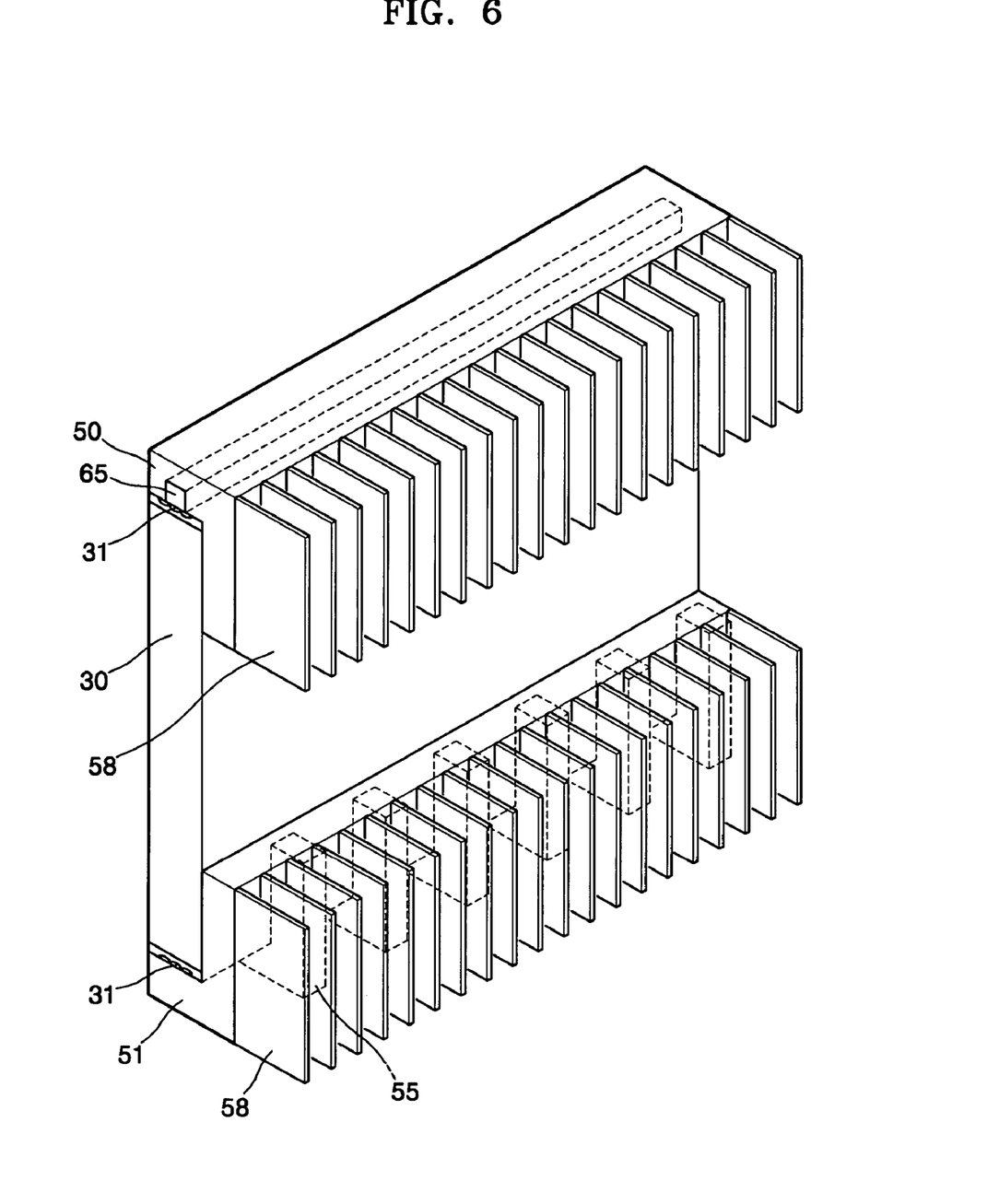
FIG. 6 is a perspective view illustrating a modification of the edge light type backlight unit having the heat sink system shown in FIG. 5.

FIG. 6 is a perspective view illustrating a modification of the backlight unit according to the third exemplary embodiment of the present invention. Referring to FIG. 6, a straight heat pipe 65 is embedded in the first conductor 50, instead of the L-shaped heat pipes 55. The L-shaped heat pipes 55 are embedded in the second conductor 51. The straight heat pipe 65 extends in the length direction on the first surface 31a of the light guide panel 30 on which the light emitting elements 31 are mounted. In other words, the straight heat pipe 65 may be disposed on the upper side of the light guide panel 30 and the L-shaped heat pipe 55 may be disposed on the lower side thereof. By providing heat pipes having different shapes on the upper and lower sides of the light guide panel 30, respectively, the heat flow can be more efficiently realized, and the principle thereof will be described below.

Figure 7A:
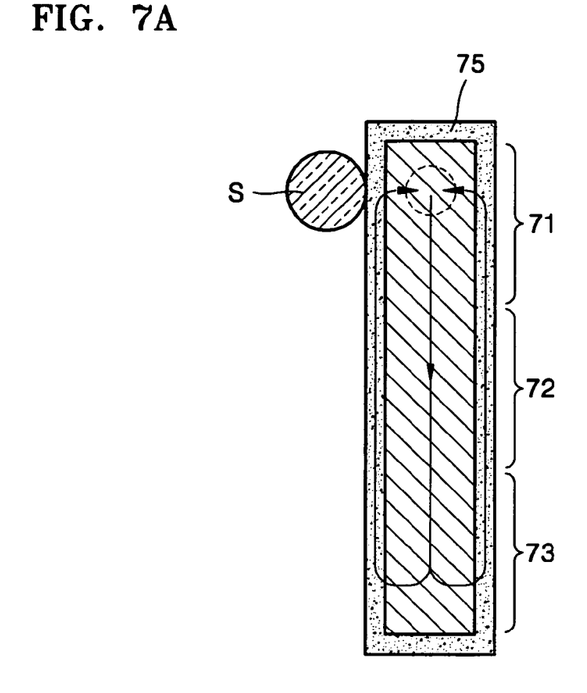
FIGS. 7A and 7B show heat flow in the heat sink system of the backlight unit shown in FIG. 6.

FIG. 7A schematically shows heat flow in a heat pipe when a heat source S is located on the upper side of the heat pipe. Referring to FIG. 7A, the heat pipe includes a vaporization portion 71 adjacent to the heat source S and an adiabatic portion 72 and a condensation portion 73 sequentially connected to the vaporization portion 71. A wick portion 75 in which fluid is absorbed and flows is provided on the outside of the heat pipe. If heat is applied from the heat source S, liquid vaporized in the vaporization portion 71 is delivered to the condensation portion 73 through the adiabatic portion 72. The gas liquefies in the condensation portion 73 and is delivered to the vaporization portion 71 through the wick portion 75 again. By this circulating process, the heat generated by the heat source S is removed.

Figure 7B:
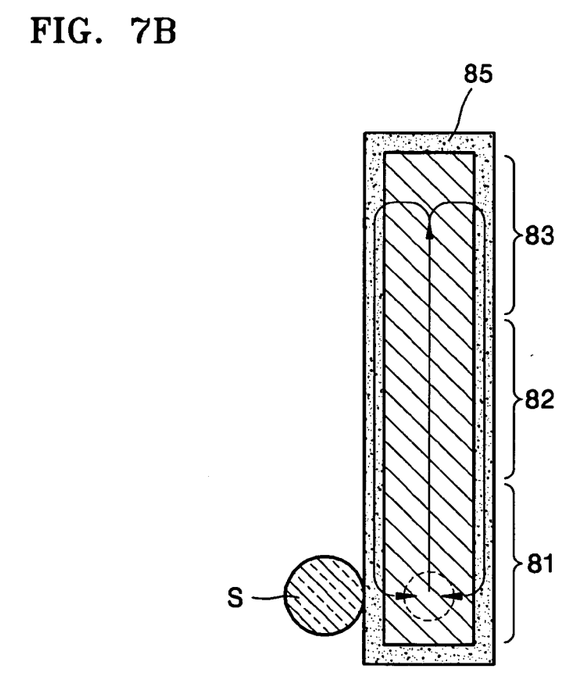

FIG. 7B shows the case that the heat source S is located on the lower side of the heat pipe. The heat pipe includes a vaporization portion 81, an adiabatic portion 82 and a condensation portion 83. Also, a wick portion 85 is provided on the outside of the heat pipe.

Comparing FIG. 7A with FIG. 7B, while the condensation portion 73 is located on the lower side in FIG. 7A, the condensation portion 83 is located on the upper side in FIG. 7B. The gas delivered from the vaporization portion is liquefied in the condensation portion and the fluid is circulated through the wick portion. Here, if the fluid is located on the upper side of the heat pipe, it easily flows to the lower side. On the other hand, if the condensation portion is located on the lower side of the heat pipe, the fluid liquefied in the condensation portion flows to the upper side against gravity, and thus the fluid flow is obstructed. Also, when the vaporization portion is located in the lower side of the heat pipe, the gas generated in the vaporization portion rises more easily, compared with the case that the vaporization portion is located in the upper side of the heat pipe. Accordingly, the heat circulation in the heat pipe is more smoothly accomplished in the case shown in FIG. 7B than in the case shown in FIG. 7A. Thus, when the heat source is located in the lower side of the heat pipe, the heat circulation is more smoothly accomplished, and thus, a cooling effect is better than the case that the heat source is located on the upper side of the heat pipe.

In consideration of the above-mentioned principle, the L-shaped heat pipe may be disposed on the lower side of the light guide panel 30. If the L-shaped heat pipe is disposed on the upper side of the light guide panel 30, the heat circulation efficiency is worse than when the L-shaped heat pipe is disposed on the lower side thereof. Accordingly, as shown in FIG. 6, instead of the L-shaped heat pipe, the straight heat pipe 65 extending in the length direction is disposed on the upper side of the light guide panel 30. If the straight heat pipe 65 extends in the length direction of the guide panel 30, the adverse effect due to the gravity is reduced, and thus the heat can be smoothly removed.

As mentioned above, in the backlight unit having the heat sink system according to an exemplary embodiment of the present invention, since LEDs are used as a light source, the light source can be driven with low power. Also, since the heat generated by the LED is emitted using the heat sink system, deterioration in the image quality due to heat can be prevented.

Also, the color change and the brightness deterioration of the light emitting element can be prevented by the heat sink system for efficiently emitting the heat generated by the light emitting elements.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An edge light type backlight unit comprising:
   a light guide panel which guides light;
   light emitting elements which are arranged on the insides of opposite first and second surfaces of the light guide panel; and
   a heat sink which is provided on the outsides of the first and second surfaces and emits heat generated by the light emitting elements; wherein the heat sink comprises
   a first conductor having a first cover surface for covering the first surface and a second cover surface which is bent with respect to the first cover surface and extends along a third surface of the light guide panel; and
   a second conductor having a third cover surface for covering the second surface and a fourth cover surface which is bent with respect to the second cover surface and extends along the third surface of the light guide panel; and
   a plurality of heat sink pins arranged on the second and fourth cover surfaces.

2. The edge light type backlight unit according to claim 1, further comprising a plurality of heat pipes embedded in the first and second conductors.

3. The edge light type backlight unit according to claim 2, wherein the heat pipes are L-shaped and the heat pipes are arranged at regular intervals in the first and second conductors.

4. The edge light type backlight unit according to claim 1, comprising a straight heat pipe extended in a length direction in the first conductor, and L-shaped heat pipes arranged in the second conductor at regular intervals.

5. The edge light type backlight unit according to claim 1, wherein the first surface of the light guide panel is the upper surface of the light guide panel and the second surface of the light guide panel is the lower surface of the light guide panel.

6. The edge light type backlight unit according to claim 1, wherein the heat sink comprises:
- a first heat pipe having a first cover surface for covering the first surface and a second cover surface which is bent with respect to the first cover surface and extends along a third surface of the light guide panel; and
- a second heat pipe having a third cover surface for covering the second surface and a fourth cover surface which is bent with respect to the second surface and extends along the third surface of the light guide panel; and
- a plurality of heat sink pins arranged on the second and fourth cover surfaces.

7. A backlight unit comprising:
- a light guide panel;
- light emitting elements attached to the light guide panel, and facing a center of the light guide panel; and
- a heat sink connected to the light emitting elements and emitting heat generated by the light emitting elements;
- wherein the heat sink comprises:
- a first conductor attached to the light emitting elements, wherein the first conductor comprises a first cover surface which covers a first surface on which the light emitting elements are disposed and a second cover surface, which is bent with respect to the first cover surface; and heat sink pins disposed on the second cover surface;
wherein the light emitting elements comprise a first set of light emitting elements disposed on a first surface of the light guide panel and a second set of light emitting elements disposed on a second surface of the light guide panel, and wherein the second surface is opposite the first surface.

8. The backlight unit according to claim 7, wherein the heat sink further comprises:
- a second conductor comprising a third conductor surface which covers the second surface;
- wherein the second conductor further comprises a fourth conductor surface which is bent at an angle with respect to the second conductor surface; and
- further comprising heat sink pins disposed on the fourth conductor surface.

9. The backlight unit according to claim 8, wherein the heat sink further comprises an L-shaped heat pipe arranged in the first conductor.

10. The backlight unit according to claim 8, wherein the heat sink further comprises a straight heat pipe arranged in the first conductor.

11. The backlight unit according to claim 8, wherein the heat sink further comprises heat pipes arranged in the first and second conductors.

12. The backlight unit according to claim 11, wherein the heat pipes are L-shaped.

13. The backlight unit according to claim 11, wherein the heat pipes arranged in the first conductor are straight and extend in a length direction of the first conductor and the heat pipes arranged in the second conductor are L-shaped.

\* \* \* \* \*